United States Patent
Graf et al.

(10) Patent No.: US 6,785,295 B1
(45) Date of Patent: Aug. 31, 2004

(54) SIGNALLING IN A TELECOMMUNICATIONS NETWORK

(75) Inventors: Leslie Graf, Melbourne (AU); Christian Groves, Keilor (AU); Juan Noguera-Rodriguez, Essendon (AU); Mark Hollis, Park Orchards (AU); Stephen Terrill, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/570,138

(22) Filed: May 12, 2000

(30) Foreign Application Priority Data

May 15, 1999 (GB) ............................................. 9911244

(51) Int. Cl.[7] .................................................. H04J 1/16
(52) U.S. Cl. ...................................................... 370/467
(58) Field of Search .............................. 370/391, 395.5, 370/395.51, 395.52, 345.6, 465, 466, 470, 476, 389, 522, 524, 469, 252, 254, 351, 352, 401

(56) References Cited

U.S. PATENT DOCUMENTS

| 5,717,691 | A | * | 2/1998 | Dighe et al. |
| 5,793,771 | A | * | 8/1998 | Darland et al. |
| 6,151,390 | A | * | 11/2000 | Volftsun et al. |
| 6,324,173 | B1 | * | 11/2001 | Deschaine et al. |
| 6,407,992 | B1 | * | 6/2002 | Pasternak et al. |
| 6,449,276 | B1 | * | 9/2002 | Subbiah et al. |

* cited by examiner

*Primary Examiner*—Dang Ton

(57) ABSTRACT

A signalling point of a telecommunications network comprises a Transport Independent Call Control (TICC) part 4. A signalling transport part 6 is arranged to exchange call control signalling information with the TICC part 4 and with a peer TICC part at a remote signalling point. A signalling transport converter 5 is arranged logically between the TICC part 4 and said signalling transport part 6 and is arranged to present a standard interface to the TICC part 4 and a specific interface to the signalling transport part 6, wherein said call control signalling is exchanged between the TICC part 4 and the signalling transport part 6 via the signalling transport converter 5.

7 Claims, 1 Drawing Sheet

SIGNALLING IN A TELECOMMUNICATIONS NETWORK

FIELD OF THE INVENTION

The present invention relates to signalling in a telecommunications network and more particularly to the provision of a call control protocol which is independent of the signalling traffic bearer.

BACKGROUND TO THE INVENTION

Current telecommunications networks currently rely to a large extent upon the Signalling System no.7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP 1, MTP 2, and MTP 3 which handle the formatting of signalling messages for transport over the physical layer as well as various routing functions.

There has been considerable interest of late amongst the telecommunications community in using non-standard (i.e. non-conventional within the telecommunications industry) signalling transport mechanisms in telecommunications networks in place of the conventional SS7 mechanisms. The reasons for this are related both to improvements in efficiency as well as potential cost savings. Much consideration has been given for example to the use of Internet Protocol (IP) networks to transport signalling information between signalling points. IP networks have the advantage that they make efficient use of transmission resources by using packet switching and are relatively low in cost due to the widespread use of the technology (as opposed to specialised telecommunication technology). There is also interest in using other transport mechanisms including AAL1/2/5, FR etc.

The standard ISUP which deals with the setting-up and control of call connections in a telecommunications network is closely linked to the SS7 signalling transport mechanism and does not readily lend itself to use with other non-standard transport mechanisms such as IP and AAL2. As such, several standardisation bodies including the ITU-T, ETSI, and ANSI, are currently considering the specification of a signalling protocol for the control of calls, which is independent of the underlying transport mechanism. This can be viewed as separating out from the protocol bearer control functions which relate merely to establishing the parameters (including the start and end points) of the "pipe" via which user plane data is transported between nodes, and which are specific to the transport mechanism. The new protocol, referred to as Transport Independent Call Control (TICC), retains call control functions such as the services invoked for a call between given calling and called parties (e.g. call forwarding), and the overall routing of user plane data.

SUMMARY OF THE PRESENT INVENTION

The inventors of the present invention have recognised that different signalling transport mechanisms such as IP, AAL2, AAL5 and the like will have different requirements for the interface with the higher TICC protocol. For example, different transport mechanisms may expect to send and receive different sized data packet units to and from the higher protocol layers. In order to make TICC fully independent of the signalling transport mechanism therefore, it is necessary to introduce an adaptation layer between the TICC and the signalling transport mechanism.

According to a first aspect of the present invention there is provided a signalling point of a telecommunications network, the signalling point comprising:

a Transport Independent Call Control (TICC) part;

a signalling transport part arranged to couple call control signalling information between said TICC and peer TICC part at a remote signalling point; and a signalling transport converter arranged logically between said TICC part and said signalling transport part and arranged to present a standard interface to the TICC part and a specific interface to the signalling transport part, wherein said call control signalling is exchanged between the TICC part and the signalling transport part via the signalling transport converter.

Embodiments of the present invention enable the TICC to be standardised in a form which enables the TICC to be used with any signalling transport part. Generic message primitives are exchanged between the TICC and the signalling transport converter whilst specific message primitives are exchanged between the signalling transport converter and the signalling transport part. The signalling transport converter (STC) depends to some extent upon the signalling transport part (STP). The TICC assumes certain functionality of the STC/STP combination but does not necessarily care whether the functionality is provided by the STC or the STP. In certain embodiments, the signalling transport converter may deal with any adjustments in Packet Data Unit (PDU) size, e.g. the segmentation of TICC messages, and with any address transformations.

Preferably, the signalling point comprises a Bearer Control (BC) part which is separate from the TICC part, the BC part being arranged to exchange information with a peer BC part. The BC part is arranged inter alia to define and establish a pipe on a link between two nodes of the network and through which user plane data is transported.

According to a second aspect of the present invention there is provided a method of transporting signalling information between peer Transport Independent Call Control (TICC) parts located at respective signalling points of a telecommunications network, the method comprising transferring signalling information between a TICC part and a signalling transport part at the same signalling point by exchanging the signalling information between the TICC part and a signalling transport converter in the form of generic message primitives, and exchanging the signalling information between the signalling transport converter and the signalling transport part in the form of specific message primitives.

DETAILED DESCRIPTION OF CERTAIN EMBODIMENTS

As has already been mentioned above, the ITU-T (in co-operation with ETSI and ANSI) are in the process of specifying a Transport Independent Call Control (TICC) part which will offer similar functionality to ISUP but which will be independent of the bearer or signalling transport mechanism. Table 1 presents examples of (ISUP) functions which may be included in TICC because they relate to call control, and functions which should not be included because they relate to bearer control (Table 1 also illustrates optional functions).

Figure 1:
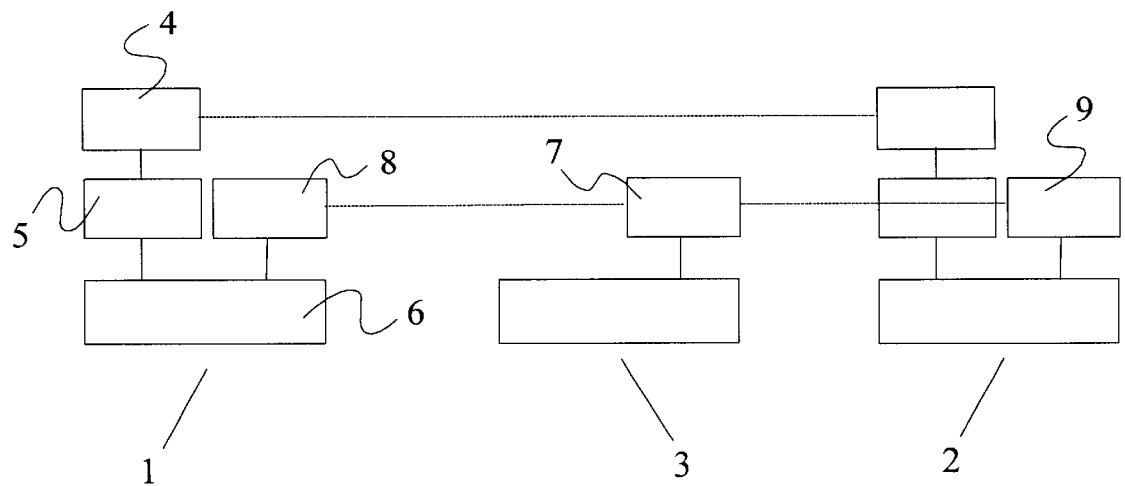
FIG. 1 illustrates the signalling protocol level used at a number of signalling points in a telecommunications network.

With reference to FIG. 1, a portion of a telecommunications network is illustrated. The illustrated portion comprises two signalling points 1, 2, a first of which represents an originating signalling point 1 for a call made between a calling party (not shown) which is coupled to the signalling point 1 and a called party (also not shown). A second of the signalling points represents a terminating signalling point 2 for this call, with the called party being coupled to the terminating signalling point 2. Arranged between the signalling points 1,2 is a bearer switching point of the bearer network. The bearer network in this example is an Internet Protocol (IP) network, and the signalling point 3 is a router of that IP network. It will be appreciated that several routers may be provided between the originating and terminating signalling points 1, 2 and that the use of a single router 3 in FIG. 1 is only an example.

At the originating signalling point 1, call control is handled by the TICC part 4. In particular, the TICC part 4 maintains the logic for a given call, e.g. given a calling party and a called party, the logic determines the destination of the call taking into account any invoked services such as call forwarding. TICC messages are generated by the TICC part 4 in the form of generic message primitives. These will be standardised so that they are vendor independent. For example, the primitives may be in the form of fixed length packet data units (e.g. 2000 octets in length) and may contain a destination address (this address may be a name having one of several different existing formats, e.g. an E.164 address, IP alias, GT, etc) which is independent of the transport mechanism.

Beneath the TICC part 4 in the protocol stack at the originating signalling point 1 is a Signalling Transport Converter (STC) 5. The STC 5 is designed to interface the standardised TICC part 4 to a specific signalling transport part 6. More particularly, the STC 5 takes the generic message primitives received from the TICC part 4 and converts them into specific message primitives of a type which the signalling transport part 6 is arranged to receive. This may involve segmenting the PDUs received from the TICC part 4 into smaller blocks. For example, where the signalling transport part 6 comprises an MTP3 layer, 2000 octet PDUs may be segmented into smaller 272 octet PDUs. The STC 5 also takes care of any address translation. In the case where the signalling transport part 6 contains an MTP3 layer, this involves translating the E.164 addresses received from the TICC into Destination Point Codes. The STC 5 performs further services for the TICC part 4 such as In-Sequence delivery and Assured Transport mode.

The signalling transport part 6 in one example comprises an IP layer coupled to the STC 5 via a Signalling Connection and Control Part (SCCP). Optionally, beneath the IP layer are, in sequence, MTP3b, Q.2140 , Q.2110 , AAL5, and ATM layers. Beneath the ATM part is the physical layer which may use the E.1 or T.1 transmission standards.

The protocol stack at the terminating signalling point 2 is the same as that at the originating signalling point 1. However, at the bearer switching point or router 3 only the signalling transport part 6 is required, in addition to a Bearer Control (BC) part 7 which communicates with peer BC parts 8, 9 at the originating and terminating signalling points 1, 2. The BC parts 7 to 9 are involved in establishing the "pipe" through which user plane data, e.g. voice or facsimile, is transmitted between nodes. The BC parts determine for example the bandwidth, quality, and encoding scheme for the pipe, and may also determine the start and end points of the pipe.

Figure 2:
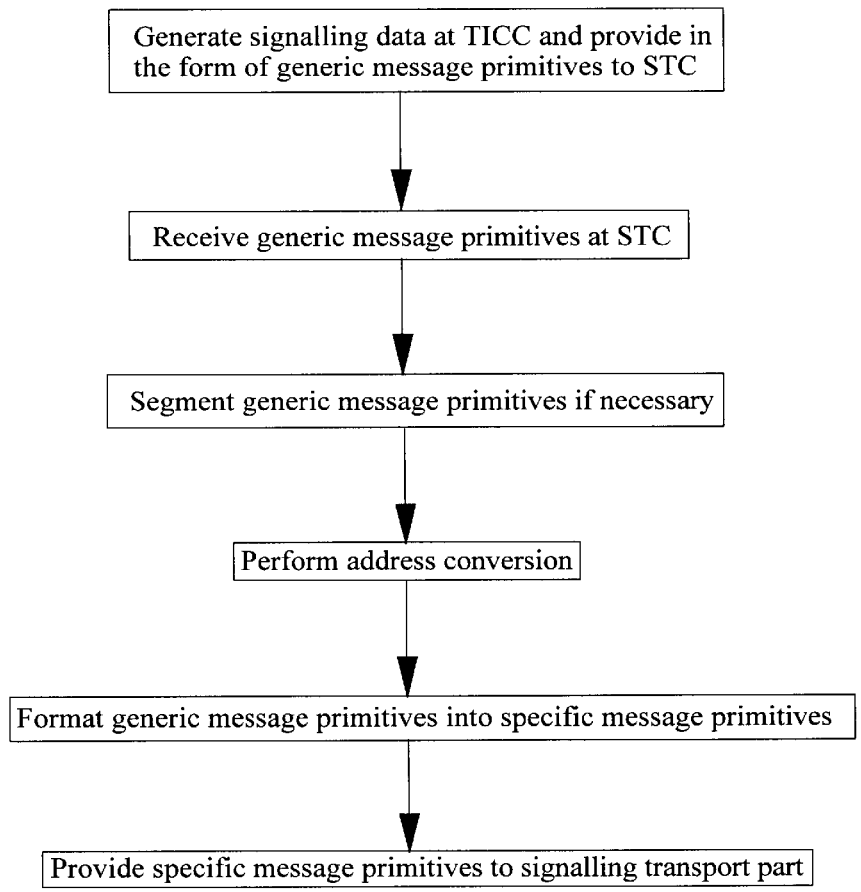
FIG. 2 is a flow diagram illustrating a method of processing signalling information in a signalling part of the network of FIG. 1.

The signalling method described above is further illustrated in the flow diagram of FIG. 2.

It will be appreciated that various modifications may be made to the above described embodiment without departing from the scope of the present invention. For example, one or more signalling points may be present between the originating and terminating signalling points 1, 2, and which require call control, i.e. the TICC and STC parts 4, 5. These additional signalling points may exist at the boundaries between different networks, e.g. at international transit exchanges, or at national transit exchanges connecting two networks of different operators or two parts of the same operator's network.

Whilst the above example has shown a network in which the BC and TICC parts share the same transit network, this need not be the case and BC and TICC data may be carried on separate networks. Thus, rather than share a common signalling transport part, the BC and TICC may have separate signalling transport parts.

TABLE 1

| ITU-T ISUP 2000 Function/service | Applicability to TICC |
|---|---|
| Basic call | |
| Speech/3.1 kHz audio | Required |
| 64 kbit/s unrestricted | Required |
| Multirate connection types | Required |
| N × 64 kbit/s connection types | Required |
| En bloc address signalling | Required |
| Overlap address signalling | ? |
| Transit network selection | Required |
| Continuity check | Not Required |
| Forward transfer | Required |
| Simple segmentation | Not Required |
| Tones and announcements | Required |
| Access delivery information | Required |
| Transportation of User teleservice information | ? |
| Suspend and resume | Required |
| Signalling procedures for connection type allowing fallback capability | Required |
| Propagation delay determination procedure | Not Required |
| Enhanced echo control signalling procedures | Not Required |
| Simplified echo control signalling procedures | Required |
| Automatic repeat attempt | Required |
| Blocking and unblocking of circuits and circuit groups | Not Required |
| Circuit group query | Not Required |
| Dual seizure | ? |
| Transmission alarm handling for digital inter-exchange circuits | Not Required |
| Reset of circuits and circuit groups | Not Required |
| Receipt of unreasonable signalling information | Required |
| Compatibility procedure | Required |
| Temporary trunk blocking | Not Required |
| ISDN User Part signalling congestion control | Required |
| Automatic congestion control | Required |
| Interaction between N-ISDN and INAP | Required |
| Unequipped circuit identification code | Not Required |
| ISDN User Part availability control | Required |
| MTP pause and resume | Required |
| Overlength messages | Not Required |
| Temporary Alternative Routing (TAR) | Required |
| Hop counter procedure | Required |
| Collect call request procedure | Required |

TABLE 1-continued

| ITU-T ISUP 2000 Function/service | Applicability to TICC |
|---|---|
| Hard-to-Reach | Required |
| Calling Geodetic location procedure | Required |
| Generic signalling procedures | |
| End-to-end signalling - Pass along method | Not Required |
| End-to-end signalling - SCCP Connection Orientated | Not Required |
| End-to-end signalling - SCCP Connectionless | Not Required |
| Generic number transfer | Required |
| Generic digit transfer | Required |
| Generic notification procedure | Required |
| Service activation | Required |
| Remote Operations Service (ROSE) capability | Not Required |
| Network specific facilities | Required |
| Pre-release information transport | Required |
| Application Transport Mechanism (APM) | Required |
| Redirection | Required |
| Pivot Routeing | Required |
| Supplementary services | |
| Direct-Dialling-In (DDI) | Required |
| Multiple Subscriber Number (MSN) | Required |
| Calling Line Identification Presentation (CLIP) | Required |
| Calling Line Identification Restriction (CLIR) | Required |
| Connected Line Identification Presentation (COLP) | Required |
| Connected Line Identification Restriction (COLR) | Required |
| Malicious Call Identification (MCID) | Required |
| Sub-addressing (SUB) | Required |
| Call Forwarding Busy (CFB) | Required |
| Call Forwarding No Reply (CFNR) | Required |
| Call Forwarding Unconditional (CFU) | Required |
| Call Deflection (CD) | Required |
| Explicit Call Transfer (ECT) | Required |
| Call Waiting (CW) | Required |
| Call HOLD (HOLD) | Required |
| Completion of Calls to Busy Subscriber (CCBS) | Required |
| Completion of Calls on No Reply (CCNR) | Required |
| Terminal Portability (TP) | Required |
| Conference calling (CONF) | Required |
| Three-Party Service (3PTY) | Required |
| Closed User Group (CUG) | Required |
| Multi-Level Precedence and Preemption (MLPP) | ? |
| Global Virtual Network Service (GVNS) | Required |
| International telecommunication charge card (ITCC) | Required |
| Reverse charging (REV) | Required |
| User-to-User Signalling (UUS) | Required |
| Additional functions/services | |
| Support of VPN applications with PSS1 Information Flows | Required |
| Support of Number Portability (NP) | Required |

What is claimed is:

1. A signalling point node within a telecommunications network, the signalling point node comprising:

a Transport Independent Call Control (TICC) part;

a signalling transport part for transporting call control signalling information between said TICC and peer TICC part at a remote signalling point node wherein said signaling transport part communicates in accordance with a particular transport protocol; and a signalling transport converter arranged logically between said TICC part and said signalling transport part and arranged to present a standard interface to the TICC part and a specific interface to the signalling transport part, wherein said call control signalling is exchanged between the TICC part and the signalling transport part via the signalling transport converter wherein generic message primitives independent of any signaling transport part are exchanged between the TICC part and the signalling transport converter whilst specific message primitives dependent on said signaling transport part are exchanged between the signalling transport converter and the signalling transport part.

2. A signalling point according to claim 1, wherein the TICC can be used with any appropriate signalling transport part.

3. A signalling point according to claim 1, wherein the signalling transport converter is arranged to perform functions assumed by the TICC part and which are not provided by the signalling transport part.

4. A signalling point according to claim 1, wherein the signalling transport converter is arranged to handle any adjustments in Packet Data Unit (PDU) size and/or address transformations.

5. A signalling point according to claim 1, wherein the signalling point comprises a Bearer Control (BC) part which is separate from the TICC part, the BC part being arranged to exchange information with a signalling transport part for the purpose of establishing a pipe on a link between two nodes of the network and through which user plane data is transported.

6. A method of transporting signalling information between peer Transport Independent Call Control (TICC) parts located at respective signalling points of a telecommunications network, the method comprising transferring signalling information between a TICC part and a signalling transport part at the same signalling point by exchanging the signalling information between the TICC part and a signalling transport converter in the form of generic message primitives wherein said generic message primitives are independent of any transport protocol, and exchanging the signalling information between the signalling transport converter and the signalling transport part in the form of specific message primitives wherein said specific message primitives are specific to said transport protocol being used by said signaling transport part within said signaling point.

7. The method of claim 6 wherein the signalling transport converter is arranged to handle any adjustments in Packet Data Unit (PDU) size and/or address transformations.

* * * * *